United States Patent
Ahn (10) Patent No.: US 7,990,872 B2
(45) Date of Patent: Aug. 2, 2011

(54) WIRELESS LAN SYSTEM AND TRANSMISSION METHOD OF DATA THEREOF

(75) Inventor: Tae Hee Ahn, Osan (KR)

(73) Assignee: LG Electronics Inc., Seoul (KR)

( * ) Notice: Subject to any disclaimer, the term of this patent is extended or adjusted under 35 U.S.C. 154(b) by 1026 days.

(21) Appl. No.: 11/833,366

(22) Filed: Aug. 3, 2007

(65) Prior Publication Data

US 2008/0186945 A1    Aug. 7, 2008

(30) Foreign Application Priority Data

Feb. 6, 2007    (KR) .................. 10-2007-0012283

(51) Int. Cl.
*H04W 4/00*    (2009.01)
(52) U.S. Cl. ........ 370/236; 370/329; 370/412; 370/509; 714/748
(58) Field of Classification Search .............. None
See application file for complete search history.

(56) References Cited

U.S. PATENT DOCUMENTS

| | | | |
|---|---|---|---|
| 2005/0157675 A1* | 7/2005 | Feder et al. | 370/328 |
| 2006/0205401 A1* | 9/2006 | Palin et al. | 455/425 |
| 2007/0073822 A1* | 3/2007 | Bennett et al. | 709/206 |
| 2008/0019398 A1* | 1/2008 | Genossar et al. | 370/498 |

* cited by examiner

*Primary Examiner* — Chi H. Pham
*Assistant Examiner* — Shick Hom
(74) *Attorney, Agent, or Firm* — Birch, Stewart, Kolasch & Birch, LLP (57) ABSTRACT

The present invention relates to a frame transmission scheduling method of a wireless communication considering frame transmission delay time information. The present invention provides a wireless communication system, which comprises a transmitting station for storing a transmission time in a transmission frame, calculating a delay time using the transmission time when retransmission of the transmission frame is requested, and scheduling the transmission of the transmission frame using the delay time; and a receiving station for transmitting a response frame (ACK frame) to the transmitting station when receiving the transmission frame. According to the present invention so configured, since transmission delay time information of a frame is considered when scheduling a sequence of frame transmission, there is an advantage in that waste of wireless resources due to retransmission delay of frames can be prevented.

20 Claims, 5 Drawing Sheets

Fig.1

– EDCA channel access method –

Fig.2

Contention between ACs in station

Fig.3

– EDCA TXOP bursting –

Fig.4

– ACK frame –

Fig.5

– Data frame –

WIRELESS LAN SYSTEM AND TRANSMISSION METHOD OF DATA THEREOF

BACKGROUND OF THE INVENTION

1. Field of the Invention

The present invention relates to a frame transmission scheduling method of a wireless communication considering frame transmission delay time information.

2. Description of the Related Art

Wireless local area networks (LAN) are widely used in a variety of wireless user environments such as home networks, enterprise
e wireless networks and hot spots. A legacy commercial wireless LAN is an extension of the Ethernet, which provides only best effort services based on IEEE 802.11b standardized in 1999. However, wireless LAN users desire faultless transfer of multimedia streams without losing transmission data. Particularly, even in a wireless LAN environment, superior quality of service (QoS) is indispensable to new applications such as video or multimedia streaming.

Continuous desires of users for bandwidth expansion cause increased congestion and decreased relative transmission speed of the entire wireless network. Accordingly, a network manager comes to need a new mechanism to guarantee services of applications that require strict QoS even in a network with high congestion. Such requirements result in the development of a further enhanced media access control (MAC) protocol than in the conventional LAN.

802.11 MAC defines a mandatory function of distributed coordination function (DCF) and an optional function of point coordination function (PCF). That is, a transmission medium can operate both in contention mode of DCF and in contention free mode of PCF. DCF is an asynchronous transmission method, which provides a basic medium access method of 802.11 MAC and has been implemented in all kinds of commercial wireless LAN products. In terms of wireless medium access, DCF does not consider priorities between stations (terminals, hereinafter referred to as 'STA') at all. Such a characteristic of DCF does not reflect transmission of various types of data traffic, and thus cannot support QoS requested by users in the end.

A synchronous transmission method is a medium access method based on a polling mechanism, which is implemented through PCF. In PCF, a function of a point coordinator (PC) is placed at a central access point (hereinafter, referred to as 'AP'), and the AP directly controls all services provided to STAs in a centralized polling scheme. That is, the AP periodically polls connected STAs to give an opportunity to transmit frames to the STAs.

Legacy 802.11 MAC has many problems in supporting wireless LAN QoS. The DCF, i.e. a mandatory function of 802.11 MAC, does not provide any function of supporting QoS. Accordingly, when a DCF method is used, all data traffics are serviced in order of arriving at a transmission queue and processed in best effort mode.

Contrary to the DCF, PCF of 802.11 MAC has been developed to support real-time traffic services but currently supports QoS. However, the PCF has the following problems.

That is, in PCF, the PC placed at the AP defines a scheduling algorithm for the purpose of polling simply based on a round-robin method. However, there are practically various types of traffics that require differentiated QoS, and thus, the round-robin algorithm that cannot assign a priority to traffic is insufficient for supporting QoS.

Further, there is a problem in that if the size of a super frame is small, alternations between a contention period and a contention free period can lead to a considerable overhead.

Further, in legacy MAC, transmission of beacon frames or a starting point of a super frame can be changed. The PC prepares a beacon frame that should be transmitted after a target beacon transmission time (TBTT), and then transmits the beacon frame if the medium is idle as long as a point inter-frame space (PIFS). However, even though STAs cannot complete transmission of frames before a subsequent TBTT, they even can start to transmit frames. Therefore, there is another problem in that the transmission of beacon frame can be delayed.

The delay of beacon frame which should be transmitted immediately after the TBTT delays the transmission of time-constraint frames which should be transmitted within the contention free period. Such a problem causes time delay that is difficult to estimate in a contention free period and thus has a serious influence on QoS.

SUMMARY OF THE INVENTION

Therefore, the present invention has been conceived to solve the aforementioned problems in the prior art. Accordingly, an object of the present invention is to provide a wireless communication system and a method of transmitting frames thereof, wherein delay time information of a frame is considered when scheduling transmission of frames using a contention-based channel access method for enhancing quality of service of wireless communications.

Another object of the present invention is to provide a wireless communication system and a method of transmitting frames thereof, wherein retransmission frames can be preferentially transmitted to prevent transmission of the retransmission frames from being delayed for an extended period of time by allowing a virtual collision handler to select a transmission frame based on delay time information of a frame as well as a user priority, if a collision occurs between varying ACs.

According to an aspect of the present invention for achieving the objects, there is provided a wireless communication system, which comprises a transmitting station for storing a transmission time in a transmission frame, calculating a delay time using the transmission time when retransmission of the transmission frame is requested, and scheduling the transmission of the transmission frame using the delay time; and a receiving station for transmitting a response frame (ACK frame) to the transmitting station when receiving the transmission frame.

At this time, the transmission time may be stored in a delay parameter area provided in a MAC header of the transmission frame.

The transmission frame may be scheduled by dividing a predetermined range of time period into a plurality of groups, putting an adjustment value to each group, changing the user priority according to the adjustment value of a group corresponding to the delay time, and performing the transmission frame scheduling based on the changed user priority.

Further, the user priority may be set to zero if the changed user priority is smaller than zero, and may be set to seven if the changed user priority is greater than seven.

The transmission frame may be scheduled by setting a delay grade based on the delay time and storing the delay grade, and primarily determining an access category (AC) according to the user priority and adjusting the AC in consideration of the delay grade to determine a final AC to which the transmission frame belongs.

Alternatively, the transmission frame may be scheduled by determining whether the delay time exceeds a predetermined time period, and assigning the transmission frame to a transmission queue corresponding to a highest user priority to preferentially transmit the transmission frame if the delay time exceeds the predetermined time period.

Alternatively, the transmission frame may be scheduled by determining whether the delay time exceeds a predetermined time period, and assigning the transmission frame to a transmission queue with a user priority one level higher than that of a transmission queue corresponding to the user priority of the transmission frame to transmit the transmission frame, if the delay time exceeds the predetermined time period.

Preferably, the transmitting station is an access point and the receiving station is a terminal device.

The transmission frame may be a QoS data frame.

At this time, the wireless communication may be in ad-hoc mode and the transmitting and receiving stations may be terminal devices.

According to another aspect of the present invention, there is provided a wireless communication system, which comprises a transmitting station for storing a transmission time in a transmission frame; and a receiving station for transmitting a response frame (ACK frame) to the transmitting station when receiving the transmission frame, wherein the transmitting station including a virtual collision handler for selecting a frame to be transmitted using a delay time calculated from the transmission time when a collision occurs between ACs.

At this time, the virtual collision handler may divide a predetermined range of time period into a plurality of groups, put an adjustment value to each group, change the user priority specified by a priority table according to the adjustment value of a group corresponding to the delay time, compare the changed user priorities, and select and transmits a frame with a highest changed user priority.

Further, the virtual collision handler may determine whether the delay time exceeds a threshold value, and select and transmit the transmission frame most preferentially if any transmission frame has a delay time exceeding the threshold value.

According to a further aspect of the present invention, there is provided a wireless communication data transmission method for enhancing quality of service of a wireless communication in contention-based channel access mode, the method comprising the steps of (A) storing a transmission time in a transmission frame to be transmitted; (B) transmitting the transmission frame; (C) examining whether a response frame is received within a predetermined time period; (D) calculating a delay time from the transmission time and setting a user priority of the transmission frame using the delay time, if the response frame is not received within the predetermined time period; (E) determining an AC according to the set user priority; and (F) transmitting the transmission frame to a transmission queue corresponding to the AC.

At this time, step (D) of setting a user priority may be accomplished by dividing a predetermined range of time period into a plurality of groups, putting an adjustment value to each group, and changing a user priority set from a priority table according to the adjustment value of a group corresponding to the delay time.

The method of the present invention may further comprise the steps of (D') setting the user priority to zero if the user priority is smaller than zero; and (D") setting the user priority to seven if the user priority is greater than seven.

Preferably, the transmitting station is an access point, and the receiving station is a terminal device.

The transmission frame may be a QoS data frame.

On the other hand, both the transmitting station and the receiving station may be terminal devices, and the wireless communication may be in ad-hoc mode.

According to a still further aspect of the present invention, there is provided a wireless communication data transmission method for enhancing quality of service of a wireless communication in contention-based channel access mode, the method comprising the steps of (a) storing a transmission time in a transmission frame to be transmitted; (b) transmitting the transmission frame; (c) examining whether a response frame is received within a predetermined time period; (d) setting a user priority of the transmission frame according to a priority table if the response frame is not received within the predetermined time period; (e) determining an AC of the transmission frame using a delay time calculated based on the user priority and the transmission time; and (f) transmitting the transmission frame to a transmission queue corresponding to the AC.

At this time, step (e) of determining an AC may comprise the steps of calculating a delay grade corresponding to the delay time, and determining an AC, to which the transmission frame belongs, according to the delay grade.

Alternatively, step (e) of determining an AC may comprise the steps of determining whether the delay time exceeds a predetermined time period, and assigning the transmission frame to an AC with a top priority if the delay time exceeds a predetermined time period.

Further, step (e) of determining an AC may comprise the steps of determining whether the delay time exceeds a predetermined time period, and assigning the transmission frame to an AC with a user priority one level higher than that of an AC corresponding to the user priority of the transmission frame to transmit the transmission frame.

At this time, the transmission time may be stored in a delay parameter area provided in a MAC header of the transmission frame.

According to another aspect of the present invention, there is provided a wireless communication data transmission method for enhancing quality of service of a wireless communication in contention-based channel access mode, the method comprising the steps of (I) storing a transmission time in a transmission frame to be transmitted; (II) transmitting the transmission frame; (III) detecting whether an internal collision occurs between ACs; (IV) selecting, by a virtual collision handler, a transmission frame to be transmitted in consideration of the transmission time, if the internal collision occurs between the ACs; and (V) transmitting the selected transmission frame.

At this time, step of (IV) of selecting a transmission frame may comprise the steps of dividing a predetermined range of time period into a plurality of groups, putting an adjustment value to each group, changing a user priority specified by a priority table according to the adjustment value of a group corresponding to the delay time, comparing the changed user priorities, and selecting and transmitting a frame with a highest changed user priority.

Alternatively, step (IV) of selecting a transmission frame may comprise the steps of determining whether the delay time exceeds a threshold value, and selecting and transmitting the transmission frame most preferentially, if any transmission frame has a delay time exceeding the threshold value.

According to another aspect of the present invention, there is provided a wireless communication data transmission method, comprising the steps of storing received data into a corresponding data buffer according to a user priority; storing a transmission time when transmitting the stored data; driving a timer and determining, when transmitting data, whether a response message is received in response to the data before the timer reaches a specific value; calculating a delay time of the data using the stored transmission time, if the response message is not received until the timer reaches the specific value; and setting a user priority of the data using the calculated delay time to store the data into a data buffer corresponding to the user priority and then to try retransmission.

At this time, the user priority may be set when the data to be transmitted are transferred from an upper layer to a MAC layer and may be stored in a MAC header of the data.

Further, the transmission time may be stored in a delay parameter area provided in a MAC header of the data.

In addition, the delay time may be set to zero if a value measured by the timer is smaller than a default value or may be a value greater than the default value if the value measured by the timer is greater than the default value.

At this time, the user priority may be set by dividing the delay time into a plurality of groups, putting an adjustment value to each group, and changing a user priority determined by characteristics of the data according to the adjustment value of a group corresponding to the delay time.

Alternatively, the user priority may be set such that the data have a top transmission priority if the delay time exceeds a predetermined time period.

Alternatively, the user priority may be set such that the data have a user priority one level higher than the user priority determined by characteristics of the data if the delay time exceeds a predetermined time period.

According to a still further aspect of the present invention, there is provided a wireless communication data transmission method, which comprises the steps of calculating a delay time using transmission time information included in received data; storing the received data into a corresponding data buffer in consideration of the delay time and a user priority of the received data; and transmitting data selected in contention mode among data stored in at least one or more data buffers.

At this time, the method of the present invention may further comprise the step of storing a transmission time in the data when transmitting the data.

The step of storing data into a data buffer may comprise the step of storing the data into a data buffer whose transmission priority is increased or decreased, as compared with a data buffer corresponding to the user priority, according to the delay time.

Alternatively, the step of storing data into a data buffer may comprise the step of storing the data into a data buffer with a top transmission priority, if the delay time exceeds a predetermined time period.

Alternatively, the step of storing data into a data buffer may comprise the step of storing the data into a data buffer with a transmission priority one level higher than that of a data buffer corresponding to the user priority.

According to a still further aspect of the present invention, there is provided a wireless communication data transmission method, which comprises the steps of storing received data into a corresponding data buffer according to a user priority thereof; having access to a transmission medium to transmit data stored in at least one or more data buffers; and if data stored in two or more data buffers intend to be simultaneously transmitted, determining data to be preferentially transmitted in consideration of a user priority and a delay time of each data and transmitting the determined data.

At this time, the transmission data may be determined by changing the user priority of each data in consideration of the delay time and comparing the changed user priorities.

Here, the user priority may be changed by dividing the delay time into a plurality of groups, putting an adjustment value to each group, and changing the user priority according to the adjustment value.

Alternatively, if any data have a delay time exceeding a predetermined time period, the data with the delay time exceeding the predetermined time period may be determined to be preferentially transmitted.

According to the present invention so configure, since transmission delay time information of a frame is considered when scheduling a sequence of frame transmission, there is an advantage in that waste of wireless resources due to retransmission delay of frames can be prevented.

DETAILED DESCRIPTION OF THE INVENTION

In the present invention, a delay time of a transmission frame is considered when determining a priority for contention-based channel access that is used to guarantee quality of service (QoS) of a wireless communication. The present invention is not limited to the contents of the IEEE 802.11e standard. However, as a preferred embodiment of the present invention, an example that is applied in a wireless communication conforming to the IEEE 802.11e standard will be described for convenience of explanation.

Hereinafter, a wireless communication system and a method of transmitting frames thereof according to a preferred embodiment of the present invention will be described in detail with reference to the accompanying drawings.

Hereinafter, concepts of a wireless communication specified in IEEE 802.11 and an EDCA method of implementing the present invention will be first discussed, and then, specific embodiments of the present invention will be described in detail.

Figure 1:
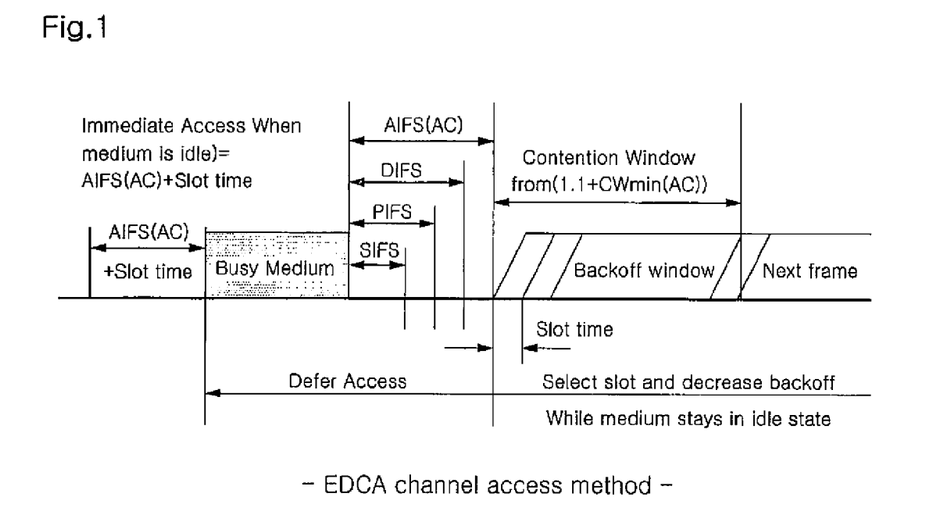
FIG. 1 is a schematic view illustrating an EDCA channel access method.
Figure 2:
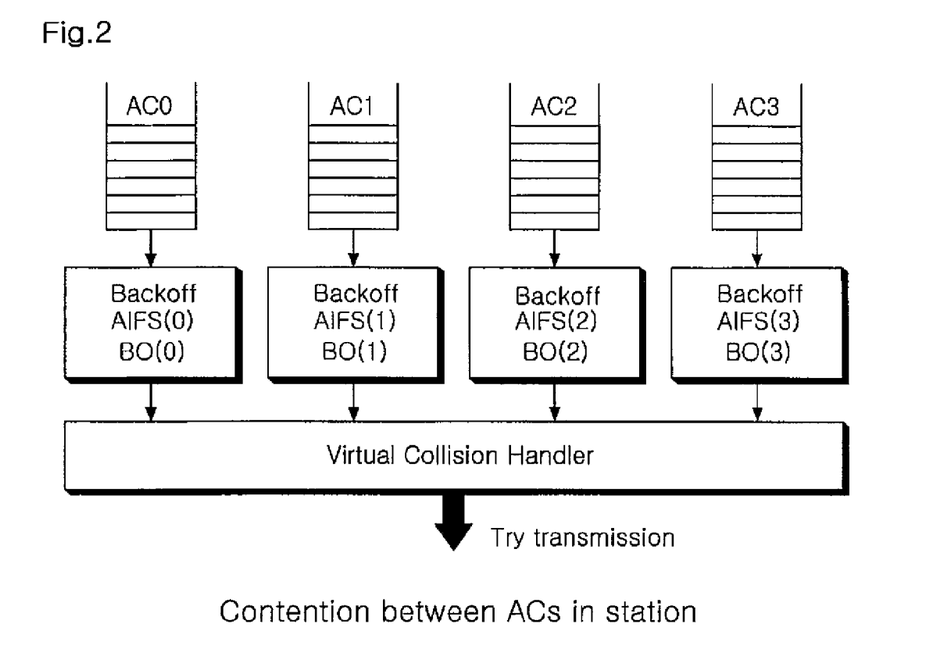
FIG. 2 is a schematic view illustrating a contention state between access categories (AC) within a station in the EDCA method.
Figure 3:
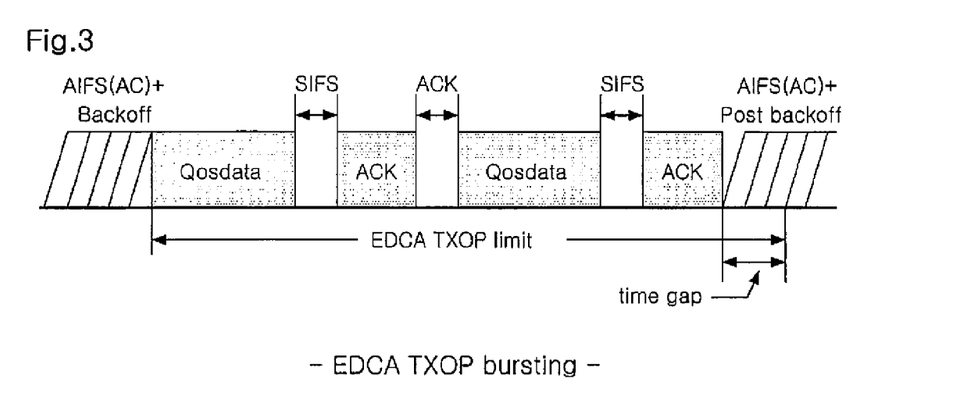
FIG. 3 is a schematic view illustrating EDCA TXOP bursting.
Figure 4:
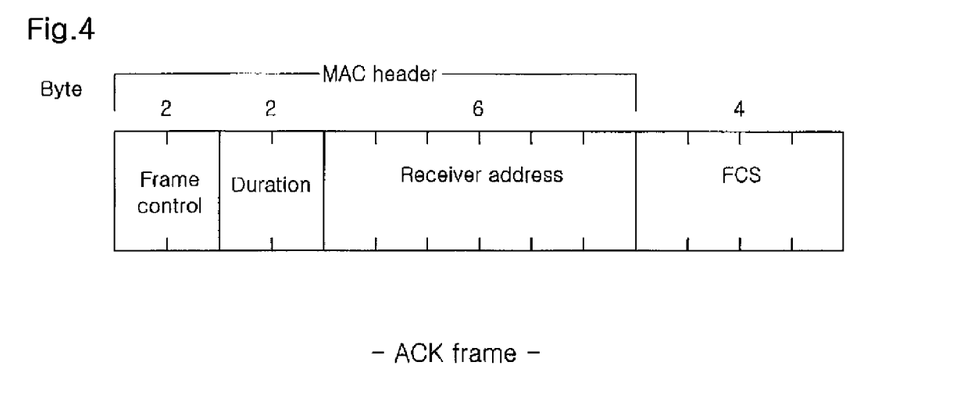
FIG. 4 is a block diagram showing a structure of an ACK frame.
Figure 5:
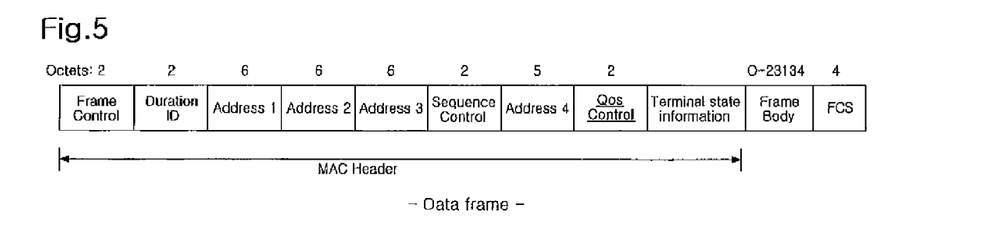
FIG. 5 is a block diagram showing a MAC header area of a transmission frame according to a preferred embodiment of the present invention.
Figure 6:
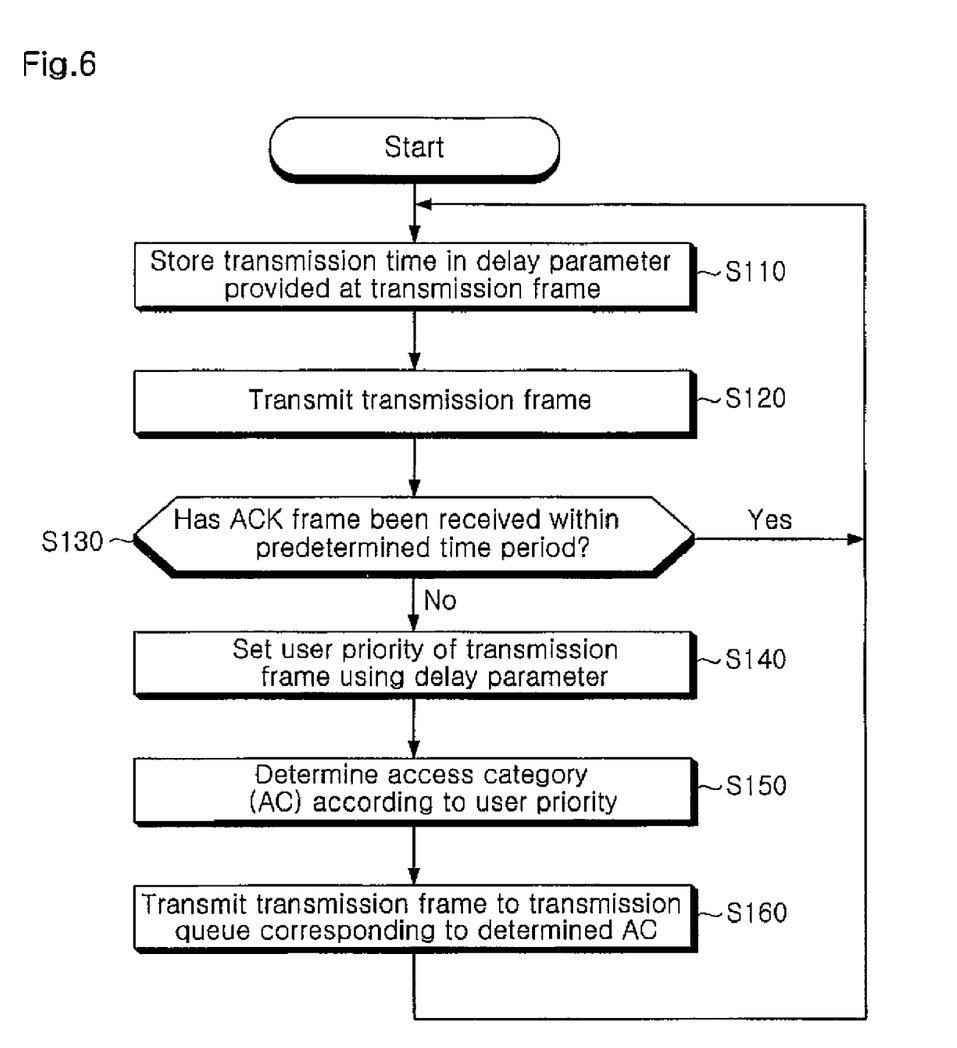
FIG. 6 is a flowchart illustrating a method of transmitting frames according to a first embodiment of the present invention.
Figure 7:
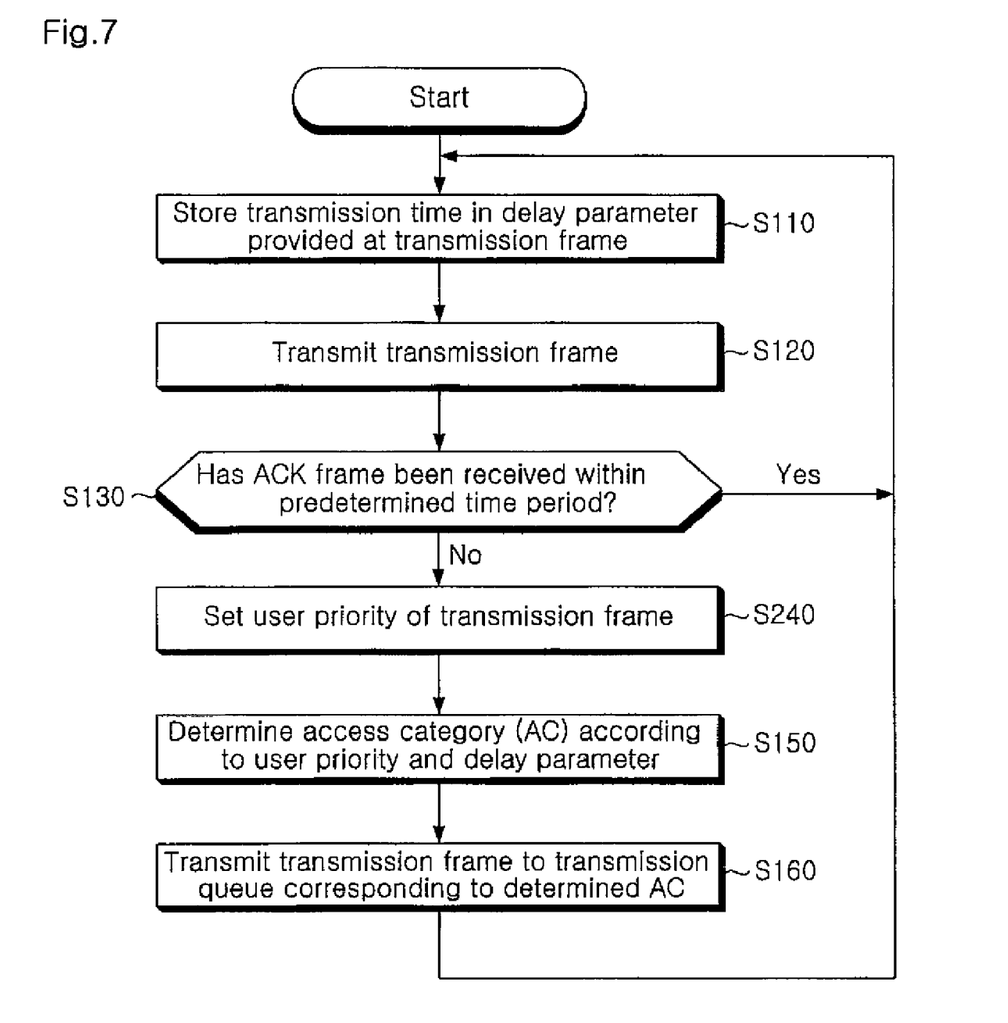
FIG. 7 is a flowchart illustrating a method of transmitting frames according to second and third embodiments of the present invention.
Figure 8:
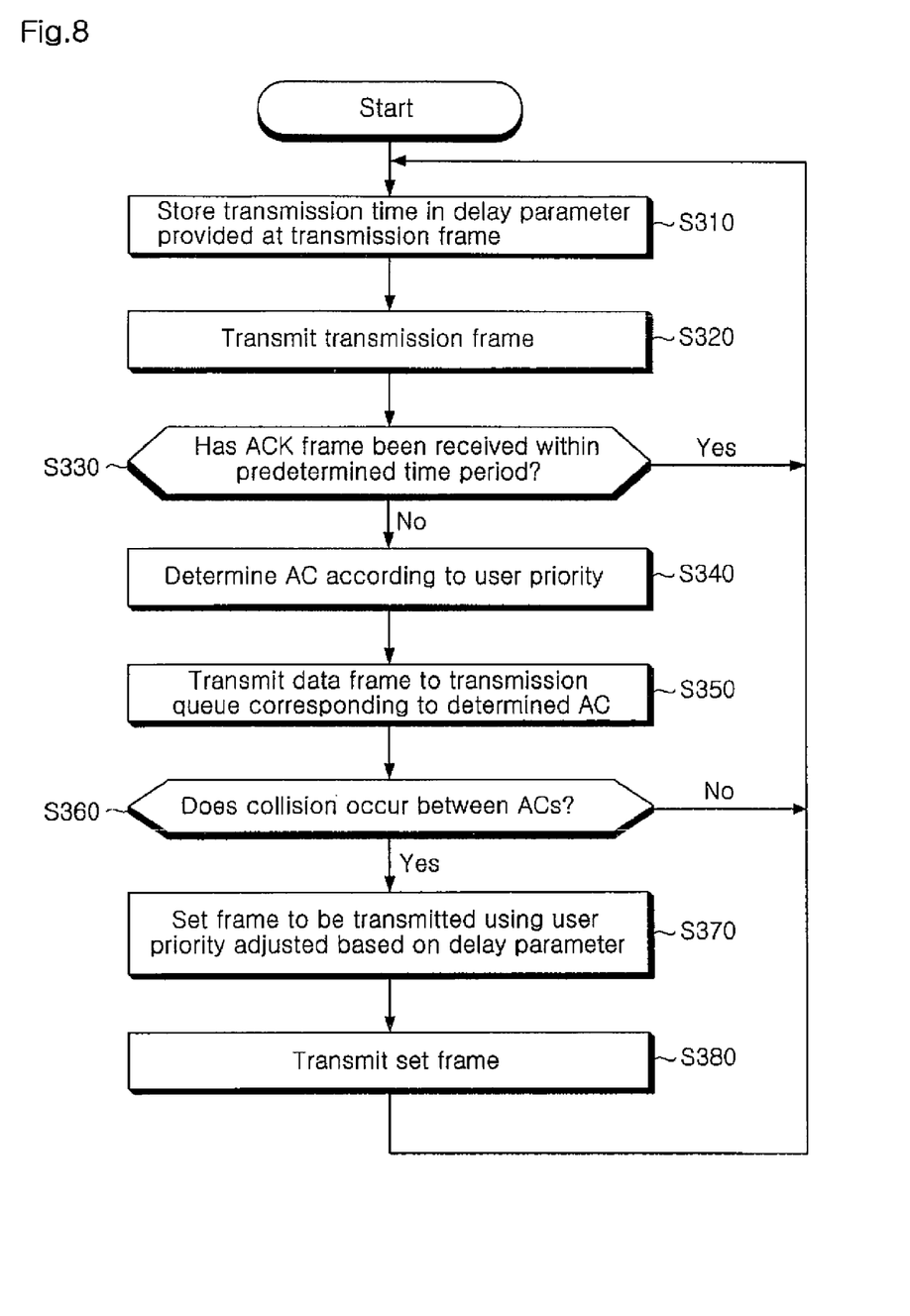
FIG. 8 is a flowchart illustrating a method of transmitting frames according to fourth and fifth embodiments of the present invention.

FIG. 1 is a schematic view illustrating an EDCA channel access method, FIG. 2 is a schematic view illustrating a contention state between access categories (AC) within a station in the EDCA method, FIG. 3 is a schematic view illustrating EDCA TXOP bursting, FIG. 4 is a block diagram showing a structure of an ACK frame, FIG. 5 is a block diagram showing a MAC header area of a transmission frame according to a preferred embodiment of the present invention, FIG. 6 is a flowchart illustrating a method of transmitting frames according to a first embodiment of the present invention, FIG. 7 is a flowchart illustrating a method of transmitting frames according to second and third embodiments of the present invention, and FIG. 8 is a flowchart illustrating a method of transmitting frames according to fourth and fifth embodiments of the present invention.

To provide further advanced QoS in a wireless LAN, 802.11e MAC that has complemented legacy 802.11 MAC is provided.

IEEE 802.11e defines EDCA and HCCA that can support QoS at a MAC layer of a wireless LAN on the basis of the DCF transmission method of 802.11 MAC to provide a new wireless LAN MAC protocol that can transmit traffic sensitive to transmission delay in addition to the best effort service.

802.11e defines hybrid coordination function (HCF) based on DCF and PCF of the legacy 802.11 MAC protocol. HCF includes a new medium access mechanism for improving QoS of a wireless LAN and can transmit QoS data in both a contention period and a contention free period. Hereinafter, QoS STA (QSTA: QoS station) defined in 802.11e refers to a station which supports QoS, and QoS AP (QAP) refers to an access point which supports QoS.

The HCF has two operation modes. One is enhanced distributed channel access (EDCA) based on contention, and another is HCF controlled channel access (HCCA) using a contention free channel access method based on a polling mechanism.

EDCA and HCCA are controlled by a hybrid coordinator (HC) located at an access point (hereinafter, referred to as AP) and are compatible with legacy 802.11 MAC using DCF and PCF. The EDCA provides a prioritized traffic similar to DiffServ of a wired network to support QoS, whereas the UCCA provides a parameterized traffic similar to IntServ of a wired network to guarantee QoS.

The EDCA method is used to support prioritized QoS in infrastructure mode and ad-hoc mode. That is, the EDCA provides a differentiated channel access function for frames that are granted with different priorities by an upper layer, whereas the HCCA provides parameterized QoS in infrastructure mode.

802.11e MAC establishes a virtual connection called as a traffic stream between two stations (terminals, hereinafter referred to as 'STA') before transmitting data in order to provide parameterized QoS. Characteristics of data that are actually transmitted and parameters that request QoS are subjected to negotiating and bartering operations in the process of establishing the traffic stream. The AP allocates a wireless bandwidth to each STA based on the bartered QoS parameters and schedules frame transmission to transmit polling frames, downlink frames and the like.

TXOP of 802.11e MAC is used to assign and guarantee a predetermined time period in which frames can be transmitted to a specific STA. A TXOP can be obtained by winning EDCA contention or by receiving a QoS CF-Poll frame from the AP. The former is called EDCA TXOP and the latter is called polled TXOP.

In this manner, using the TXOP, a predetermined time period is assigned so that a certain STA can transmit frames, or a transmission time period can be forcibly limited. A transmission starting time and a maximum transmission time period are determined by the AP, which are notified to the STA through a beacon frame in the case of the EDCA TXOP or through a QoS CF-Poll frame in the case of the polled TXOP.

EDCA is used only in a contention period, whereas HCCA can be operated in both a contention period and a contention free period. However, HCCA is preferably used only in a contention period.

Hereinafter, the EDCA method will be first described.

As described above, the EDCA, i.e. a contention-based channel access method, reinforces existing DCF to permit differentiated medium access for those frames with eight classes of user priorities. Table 1 shown below summarizes user priorities (Table 1 shows user priorities according to IEEE 802.1D). Each frame arriving at the MAC layer from an upper layer has a specific user priority value, and the user priority value is loaded on the MAC header of each QoS data frame.

TABLE 1

Table of user priority to access category mappings

| User priority | 802.1D Designation | AC(Access category) | Designation |
|---|---|---|---|
| 1 | BK | AC_BK | Back Ground |
| 2 | — | AC_BK | Back Ground |
| 0 | BE | AC_BE | Best Effort |
| 3 | EE | AC_BE | Best Effort |
| 4 | CL | AC_VI | Video |
| 5 | VI | AC_VI | Video |
| 6 | VO | AC_VO | Voice |
| 7 | NC | AC_VO | Voice |

For the transmission of QoS data frames containing those user priorities, an 802.11e QoS STA implements four access categories (AC) (refer to Table 1). The user priority of a frame arriving at the MAC layer is assigned to a corresponding AC. User priorities shown in Table 1 are specified in the IEEE 802.1D bridge standard. Every AC has a transmission queue and an AC parameter, and difference of priorities between the ACs is implemented from AC parameters that are set differently from each other.

Basically, in the contention for transmission of frames which belong to the ACs, EDCA uses AIFS[AC], CWmin[AC] and CWmax[AC] instead of DIFS, CWmin and CWmax which are used by DCF. The AIFS[AC] is determined by a SITS+AIFS[AC] slot time, in which AIFS[AC] is an integer greater than 0. Values of these EDCA parameters will be described below.

The backoff procedure of EDCA for creating a new backoff counter when collision occurs between STAs while transmitting frames is similar to that of existing DCF. A persistence factor (PB) which is differently assigned to each AC is added to EDCA. If a PF value is 2, the size of a contention window (CW) exponentially increases in the same manner as DCF.

As shown in FIG. 1, the channel access method of EDCA is similar to that of DCF. However, arbitration inter frame space (AIFS) and CW that are different in each AC are maintained. Here, the AIFS should be a value greater than the PIFS and the DIFS to protect the transmission of ACK frames or the like by setting the value greater than at least a SIFS time period.

Values of AIFS[AC], CWmin[AC], CWmax[AC] and the like that are called an EDCA parameter set can be loaded on a beacon frame by the AP and then notified to each STA. Basically, the smaller the values of the AIFS[AC] and CWmin[AC] are, the higher priority an STA has. Accordingly, channel access delay is shortened, and thus, a further wider bandwidth can be used in a given traffic environment.

The EDCA parameters are important means used to differentiate channel accesses of a variety of user prioritized traffics. In addition, if values of the EDCA parameters containing parameters of each AC are appropriately set, network performance can be optimized and an effect of transmitting traffics according to priority can be obtained. Accordingly, to guarantee fair medium access to all participating STAs in the network, the AP is required to perform overall management and control of the EDCA parameters.

As shown in FIG. 2, each of the four AC transmission queues defined in 802.11e MAC functions as an individual EDCA contention entity to access a wireless medium within an STA. Each AC has a unique AIFS value and maintains an independent backoff counter. If one or more ACs complete a backoff procedure at the same time, the virtual collision handler coordinates collisions between the ACs. A frame with the highest priority is first selected and then transmitted to contend with other STAs, and the other ACs update the backoff counter by incrementing the CW value.

As described above, 802.11e determines a transmission time period based on a TXOP when a specific STA starts transmission. The 802.11e AP loads EDCA parameters such as AIFS[AC], CWmin[AC] and CWmax[AC], and a TXOP Limit [AC] such as an EDCA TXOP time period on a beacon frame and then transfers the beacon frame to each STA.

As shown in FIG. 3, during an EDCA TXOP Limit time period, a plurality of frames with a SIFS time gap between an ACK and a subsequent frame can be simultaneously transmitted. Transmitting a plurality of frames simultaneously as such is called 'EDCA TXOP bursting'.

During the EDCA TXOP Limit time period, two QoS data frames containing a priority are transmitted. At this time, it is understood that the two QoS data frames and two ACK frames are transmitted within the TXOP Limit time period determined by the AP. Since EDCA TXOP bursting always keeps the TXOP Limit when a plurality of frames are transmitted, overall network performance is not affected by the EDCA TXOP bursting. Therefore, selecting an appropriate TXOP Limit value can enhance overall network performance.

On the other hand, in an EDCA communication, if a final destination of a frame is set (i.e., if it is not a multicast transmission method but a transfer destination of transmission data is specified), a receiving STA that receives the frame transmits a response frame (an ACK frame) to the transmitting STA to inform that the frame has been received.

The response frame is used to transmit all kinds of frames such as a simple transmission frame, a fragmented frame and a frame next to exchange of request to send/clear to send (RTS/CTS), and a structure thereof is schematically shown in FIG. 4.

As shown in the figure, the MAC header of the ACK frame comprises a frame control field, a duration field and a receiver address field.

The frame control field is a two-byte field indicating that the frame is an ACK frame.

The duration field indicates whether next subsequent data follows. In an ACK for a data frame that completes a transmission or for the last fragment of a fragment burst, the duration is set to zero to indicate that no subsequent data frame exists. If a subsequent frame exists, the duration of the ACK frame is set to one to indicate that the subsequently transmitted frame exists.

Further, the receiver address field indicates an address of a destination to which the ACK frame will be transmitted, and a sender address of the transmitted data frame is copied and stored therein.

Hereinafter, a preferred embodiment of the present invention is described.

A transmission frame according to the present invention contains a delay parameter in the MAC header area. At this time, the transmission frame includes both a data frame and a control frame, but the data frame will be described by way of example for convenience of explanation.

A data frame according to the present invention is shown in FIG. 5.

As shown in the figure, the MAC header of the data frame contains frame control, duration ID), address 1, address 2, address 3, sequence control, address 4, QoS control, and delay parameter.

Here, a location of the delay parameter is only an example, and it is apparent that the delay parameter can be provided at various locations according to the characteristics and structure of a transmission frame.

The delay parameter stores a transmission time when a data frame is initially transmitted. If retransmission of the data frame is requested, a delay time is calculated using the transmission time and can be then stored in the delay parameter.

First Embodiment

FIG. 6 is a flowchart illustrating a method of transmitting frames according to a first embodiment of the present invention.

As shown in the figure, when a flame is transmitted according to the first embodiment of the present invention, a transmission time is first stored in the transmission frame to be transmitted (S110). At this time, the transmission time is stored in the delay parameter provided at the MAC header area of the transmission frame (Of course, the transmission time can be stored in another area).

Next, the transmitting station transmits the transmission frame (S120).

After transmitting the transmission frame, the transmitting station determines whether an ACK frame has been received from the receiving station within a predetermined time period (S130).

The ACK frame is a frame which the receiving station informs the transmitting station that the transmission frame has been received.

Accordingly, if the transmitting station does not receive the ACK frame within the predetermined time period, the transmitting station considers the transmission frame as not being transferred and retransmits the transmission frame.

At this time, a user priority of the transmission frame is determined based on the delay parameter of the retransmitted transmission frame (S140).

Here, according to the first embodiment of the present invention, a delay time is calculated by comparing the transmission time stored in the delay parameter with a current time. At this time, the delay time may be defined as a time period from the transmission time to the current time. Alternatively, a time period from the transmission time to a certain time point set to a default value may be considered as not being included in a delay time, and only a time period from the default value to the current time is determined as a delay time. The reason is to prevent the user priority of the transmission data from being excessively affected by the delay time.

Accordingly, the default value may be set to a small value in the case of delay-sensitive data (e.g., in a case where it is important to receive data consecutively), whereas the default value may be set to a large value in the case of delay-tolerant data.

Then, the delay time is considered in such a manner that the user priority can be increased in proportion to the delay time. That is, if the delay time is less than $2^8$ ms, a user priority of the IEEE 802.1D standard are used as it is. If the delay time between $2^8$ ms and $2^{12}$ ms, the user priority is incremented by one step. Alternatively, if the delay time between $2^{12}$ ms and $2^{16}$ ms, the user priority is incremented by two steps.

The increase in the user priority described above is merely an example. A variety of reference values may be applied to increase the user priority.

After the user priority of the transmission frame to be retransmitted is set, an access category (AC) is determined (S150).

If the AC is determined, the transmission frame is transmitted to a transmission queue corresponding to the determined AC (S160) and then transmitted to the receiving station. At this time, a retransmission frame is not transmitted without setting a transmission time in the frame. The reason is that if an ACK frame for the retransmitted transmission frame is not further received and a second retransmission is thus tried, it is effective that the transmitting station calculates a delay time from the initial transmission time and takes the delay time into account when determining the user priority.

Second Embodiment

FIG. 7 is a flowchart illustrating a method of transmitting frames according to second and third embodiments of the present invention. Here, it is common to the first to third embodiments of the present invention to use a delay time of a transmission frame to set a transmission queue.

As shown in the figure, the second embodiment of the present invention follows the same flow as that of the first embodiment, except steps S240 and 250 of determining an AC using a delay parameter.

That is, in the second embodiment of the present invention, a delay time is calculated and converted into a predetermined grade such that the converted grade can be stored in the delay parameter. Accordingly, a transmission time, which has been stored at the time of initial transmission as well as the delay grade are stored in the delay parameter.

Then, in the second embodiment of the present invention, a user priority is determined according to IEEE 802.1D (S240). That is, the user priority is determined according to generic features of a frame, and the AC and transmission queue are determined in consideration of the delay grade included in the delay parameter (S250).

At this time, the delay grade may be updated to a higher grade if retransmission is repeated as described above.

Third Embodiment

The third embodiment of the present invention also follows the same flow as that of the first embodiment, except the steps of determining a user priority using a delay parameter.

That is, in the second embodiment of the present invention, a delay time is calculated from the stored transmission time, and then, it is determined whether the delay time exceeds a predetermined time period. If the delay time exceeds the predetermined time period, the transmission frame is assigned to a transmission queue with the highest user priority.

Thus, in the third embodiment, the user priority does not need to be changed, and only a transmission queue is newly assigned using the delay time.

At this time, if the delay time exceeds the predetermined time period, the transmission frame may be assigned to a transmission queue with the highest user priority as described above or to a transmission queue with a user priority one level higher than that of an initially determined transmission queue.

FIG. 8 is a flowchart illustrating a method of transmitting frames according to fourth and fifth embodiments of the present invention. Here, it is common to the fourth and fifth embodiments of the present invention to use a delay time of a transmission frame to select a transmission frame when an internal collision occurs between ACs.

Fourth Embodiment

As shown in the figure, when a frame is transmitted according to the fourth embodiment of the present invention, a transmission time is first stored in the transmission frame to be transmitted (S310). At this time, the transmission time is stored in the same manner as described above in the first embodiment.

Next, the transmitting station transmits the transmission frame (S320).

After transmitting the transmission frame, the transmitting station determines whether an ACK frame has been received from the receiving station within a predetermined time period (S330).

If the transmitting station does not receive the ACK frame within the predetermined time period, the transmitting station considers the transmission frame as not being transferred and then retransmits the transmission frame.

To this end, an AC is determined for the transmission frame according to the user priority (S340).

If the AC is determined, the transmission frame is transmitted to a transmission queue corresponding to the determined AC (S350) and transmitted to the receiving station.

Then, it is determined whether an internal collision occurs between the ACs (S360). If an internal collision does not occur between the ACs, the transmission data are transmitted in a transmission order of the transmission queue.

However, if an internal collision occurs between the ACs, a virtual collision handler selects and transmits a frame with the highest user priority among the frames contained in the collided ACs. In the fourth embodiment of the present invention, the virtual collision handler selects a frame using delay time information.

That is, in the same manner as described in the first embodiment of the present invention, the user priority is changed and the changed user priority is then compared to select and transmit a transmission frame with the highest user priority.

In such a manner, the selected transmission frame is transmitted to the receiving station (S380).

At this time, the retransmission frame is transmitted without setting a transmission time in the frame. The reason is the same as described above.

Fifth Embodiment

The fifth embodiment of the present invention follows the same flow as that of the fourth embodiment, except the steps of selecting a transmission frame by the virtual collision handler.

That is, in the fifth embodiment of the present invention, if a collision occurs, the virtual collision handler examines collided frames and determines whether there is a frame whose delay time exceeds a threshold value. Here, the threshold value is a delay time value of a frame which can be considered as being abnormally delayed in a wireless LAN communication, and it may be appropriately set according to the communication environments.

At this time, if there is no frame with a delay time that exceeds the threshold value, user priorities (at this time, they correspond to user priorities in which a delay time is not considered) are compared to select a transmission frame. If there is a transmission frame with a delay time that exceeds the threshold value, the frame is first transmitted.

The reason is to transmit delayed data most preferentially to prevent waste of data flows and resources which can be anticipated if transmission is delayed quite long.

When describing preferred embodiments of the present invention, the stations are divided into transmitting and receiving stations.

In the general transmission of data frames, an AP functions as a transmitting station and a terminal device functions as a receiving station.

However, in a case where data are transmitted from a terminal device to an AP, the terminal device will be a transmitting station, and the AP will be a receiving station.

Further, in the case of not an infrastructure mode where an AP is connected to terminal devices but an ad-hoc mode where terminal devices are connected to one another, both the transmitting station and the receiving station will be terminal devices.

The following advantages can be expected from a wireless communication system and a method of transmitting frames thereof according to the present invention described above in detail.

That is, since a frame transmission sequence is scheduled in consideration of delay time information of a transmitted frame, a retransmission frame (i.e. a frame with a delay time considerably longer than that of an initially transmitted frame) can be preferentially transmitted. Therefore, it is highly probable that the retransmission is completed while a receiving terminal occupies a medium. Accordingly, there is an advantage in that the receiving terminal is less likely to contend for reoccupying the medium, which may occur when the terminal releases occupying the medium but a fragmented frame to be retransmitted has not been transmitted, and thus, wireless resources cannot be wasted.

Further, if a frame is repeatedly requested to be retransmitted (if a transmission frame does not repeatedly arrive at a destination), delay time information is accumulatively increased and a transmission priority is accumulatively increased accordingly. Therefore, there is another advantage in that a frame that is repeatedly retransmitted can be preferentially transmitted.

Although the present invention has been described and illustrated in connection with the preferred embodiments, it will be readily understood by those skilled in the art that various modifications and changes can be made thereto without departing from the spirit and scope of the present invention defined by the appended claims.

The invention claimed is:

1. A wireless communication data transmission method, comprising the steps of:
   storing received data into a corresponding data buffer according to a user priority;
   storing a transmission time when transmitting the stored data;
   driving a timer and determining, when transmitting the stored data, whether a response message is received in response to the transmitted data before the timer reaches a specific value;
   calculating a delay time of the transmitted data using the stored transmission time and a current time, if the response message is not received until the timer reaches the specific value; and
   resetting the user priority of the transmitted data of which the response message is not received until the timer reached the specific value, using the calculated delay time to store the transmitted data into a corresponding data buffer according to the reset user priority and then to try retransmission,
   wherein the delay time is set to zero if a value measured by the timer is smaller than a default value, or is set to a value greater than the default value if the value measured by the timer is greater than the default value.

2. The method as claimed in claim 1, wherein the user priority is set when the data to be transmitted is transferred from an upper layer to a MAC layer and is stored in a MAC header of the data.

3. The method as claimed in claim 1, wherein the transmission time is stored in a delay parameter area provided in a MAC header of the data.

4. The method as claimed in claim 2, wherein the user priority is set by dividing the delay time into a plurality of groups, putting an adjustment value to each group, and changing the user priority determined by characteristics of the data according to the adjustment value of a group corresponding to the delay time.

5. The method as claimed in claim 1, wherein the user priority is set such that the data has a top transmission priority if the delay time exceeds a predetermined time period.

6. The method as claimed in claim 1, wherein the user priority is set such that the data has the user priority one level higher than the user priority determined by characteristics of the data if the delay time exceeds a predetermined time period.

7. A wireless communication data transmission method, comprising the steps of:
   calculating a delay time using transmission time information included in received data to be transmitted and a current time;
   storing the data to be transmitted into a corresponding data buffer in consideration of the delay time and a user priority of the received data; and
   transmitting data selected in a contention mode among the data stored in at least one or more data buffers,
   wherein the delay time is set to zero if a value measured by a timer is smaller than a default value, or is set to a value greater than the default value if the value measured by the timer is greater than the default value.

8. The method as claimed in claim 7, further comprising the step of storing a transmission time in the data when transmitting the data.

9. The method as claimed in claim 8, wherein the transmission time is stored in a delay parameter area provided in a MAC header of the data.

10. The method as claimed in claim 9, wherein the user priority is set when the data to be transmitted is transferred from an upper layer to a MAC layer and is stored in the MAC header of the data.

11. The method as claimed in claim 7, wherein the step of storing the data includes the step of storing the data into a data buffer whose transmission priority is increased or decreased, as compared with a data buffer corresponding to the user priority, according to the delay time.

12. The method as claimed in claim 7, wherein the step of storing the data includes the step of storing the data into a data buffer with a top transmission priority, if the delay time exceeds a predetermined time period.

13. The method as claimed in claim 7, wherein the step of storing the data includes the step of storing the data into a data buffer with a transmission priority one level higher than that of a data buffer corresponding to the user priority.

14. A wireless communication data transmission method, comprising the steps of:
- storing received data into a corresponding data buffer according to a user priority thereof;
- having an access to a transmission medium to transmit data stored in at least one or more data buffers; and
- if data stored in two or more data buffers intend to be simultaneously transmitted, determining data to be preferentially transmitted in consideration of a user priority and a delay time of each data and transmitting the determined data,
- wherein the delay time of each data is calculated based on a transmission time when each data is first tried to be transmitted and on a current time, and
- wherein the delay time is set to zero if a value measured by a timer is smaller than a default value, or is set to a value greater than the default value if the value measured by the timer is greater than the default value.

15. The method as claimed in claim 14, further comprising the step of:
- storing the transmission time in the data when transmitting the data.

16. The method as claimed in claim 15, wherein the transmission time is stored in a delay parameter area provided in a MAC header of the data.

17. The method as claimed in claim 15, wherein the user priority is set when the data to be transmitted is transferred from an upper layer to a MAC layer and is stored in a MAC header of the data.

18. The method as claimed in claim 14, wherein the transmission data are determined by changing the user priority of each data in consideration of the delay time and comparing changed user priorities.

19. The method as claimed in claim 18, wherein the user priority is changed by dividing the delay time into a plurality of groups, putting an adjustment value to each group, and changing the user priority according to the adjustment value.

20. The method as claimed in claim 14, wherein if any data has the delay time exceeding a predetermined time period, the data with the delay time exceeding the predetermined time period is determined to be preferentially transmitted.

* * * * *